2,774,753
Patented Dec. 18, 1956

2,774,753

COMBINED SOLVENT AND ADSORBENT PROCESS FOR REFINING ROSIN

Edwin C. Howard, Hattiesburg, Miss., assignor to Hercules Powder Company, Wilmington, Del., a corporation of Delaware No Drawing. Application November 15, 1954,
Serial No. 468,989

10 Claims. (Cl. 260—107)

This invention pertains to a process for refining or decolorizing dark wood rosin by the combined use of a selective solvent, acetonitrile, and adsorbents.

Wood rosin is normally obtained by extracting pine stump wood with an organic solvent and recovering the rosin from the extract solution by evaporating the solvent. Solvents which have been used to effect this extraction are typified by the following: (1) paraffinics such as butane, hexane and petroleum naphtha; (2) aromatics such as benzene and toluene; and (3) polar solvents such as acetone, isopropyl alcohol, and methyl isobutyl ketone.

Depending upon the particular solvent and the extracting conditions used, the resultant wood rosin will vary from pale to dark red in color. In general, the more exhaustive extractions will produce rosins having a darker color and a larger fraction of material which is insoluble in petroleum naphtha. Because of the color, the darker rosins are limited in many industrial applications.

Accordingly, many processes have been proposed for decolorizing dark rosin. Those processes which have been adopted commercially are recognized as being either selective solvent or adsorbent refining processes.

In selective solvent refining, the dark rosin is usually partitioned between a petroleum naphtha solvent and a relatively immiscible second solvent such as furfural or phenol, which preferentially dissolves the rosin color bodies, oxidized rosin, and other impurities. The extent of the refining by this method depends upon the comparative specificities of the solvents and the number of refining stages employed. An advantage of this process is that dark rosin, having wide variations in the amount of naphtha-insoluble material (e. g., 0–80%), can be utilized. In practice, however, this process operates most efficiently when producing pale rosins grading "K–N" according to the U. S. Department of Agriculture rosin color standards. Paler grades of rosin are produced, of course, but with noticeably increased difficulty.

In adsorbent refining processes, decolorization of the dark rosin is usually accomplished by dissolving the dark rosin in an adsorbent refining solvent, such as petroleum naphtha, and then passing the resulting solution through a tower or bed containing an adsorbent. Oxidized rosin, color bodies, and other impurities are selectively adsorbed by the adsorbent from the rosin solution which is eluted during the operation, and which after evaporation of the solvent will yield a rosin of decreased color. Numerous adsorbents have been proposed for this application, such as silica gel, fuller's earth, carbon, activated bentonite and magnesium silicate. Most all of these adsorbents will refine dark rosin to very pale grades, e. g., "WG-X," in good yields.

A limitation of the adsorbent process is that rosins to be refined must be soluble in the refining solvent, such as petroleum naphtha. In other words, the dark rosin must have a low naphtha-insoluble content, preferably below 5% for convenient processing. When using wood rosin obtained by exhaustive extraction (ca. 20–30% naphtha insoluble), a large quantity will precipitate out in the processing equipment. Recovery of this occluded material can be accomplished only by melting or dissolving it out with a strong solvent in a time consuming batch operation.

Through the years the gasoline-insoluble fraction, containing a small amount of refinable rosin, has found a market in a number of industrial applications, such as in sizing dark paper products, phonograph record formulations, core binders, and air entraining concrete. Hence, this material must be considered as a valuable co-product with pale rosin in the naval stores industry.

Accordingly, numerous investigations have been made to develop a process for producing high yields of both very pale rosin and a product containing a large fraction of naphtha-insoluble material. From this work has come a number of suggestions for the use of a combination of a selective solvent with an adsorbent refining process. Evidence with these systems shows that typical selective solvents, such as phenol or furfural, will poison or decrease the specificity of the adsorbent. Because of this, it is necessary to remove the selective solvent prior to adsorbent refining. This entails an evaporation of the rosin solution and resolution in fresh naphtha or a similar operation to remove the selective solvent.

By this invention it is possible to produce high yields of both pale rosins and fractions containing a large percentage of naphtha-insoluble material starting with dark rosin feeds obtained by any conventional extraction process.

The invention is based in part on the discovery that acetonitrile can be used advantageously in a combined solvent and adsorbent refining process. In so far as is known, acetonitrile is unique because in the amounts customarily carried over from solvent extraction it does not poison or decrease the specificity of the adsorbent and, as a consequence, it is not necessary to remove acetonitrile prior to adsorbent refining. Accordingly, the invention provides a process for purifying or decolorizing dark wood rosin which comprises the steps of separating dark rosin into a crude pale rosin fraction and a fraction containing primarily naphtha-insoluble material by partitioning the dark rosin between an adsorbent refining solvent and acetonitrile, and contacting the crude pale rosin solution resulting from the separation with an adsorbent that is selective for the impurities and color constituents.

The invention is further based on the discovery that acetonitrile can be used advantageously for revivifying the spent adsorbent whereby it is restored to a high level of specificity. Accordingly, the invention further includes the optional steps of revivifying the spent adsorbent, utilized in the adsorbent refining step, with acetonitrile and recovering refinable rosin from the acetonitrile utilized in revivification. The use of acetonitrile for revivification is advantageous in that conventional revivifying solvents, such as acetone, isopropanol and ethanol, are completely miscible with the most common adsorbent refining solvents, such as petroleum naphtha, whereas acetonitrile is not, and thus its use for revivification permits total recovery of refinable rosin by extraction with an adsorbent refining solvent.

The following are examples of the operability of this process and provide an indication of the degree to which the process variables can be altered. Percentages and parts are by weight unless otherwise specified.

Example 1

(a) In this experiment, a dark rosin was used which had been extracted from Ponderosa pine stump wood with toluene (petroleum naphtha-insoluble fraction was 10.4%; color darker than "D"). The following ingredients, after being solubilized at an elevated temperature, were placed in each of three separatory vessels; 150 parts of the dark rosin, 450 parts of petroleum naphtha, 70.5 parts acetonitrile, and 16 parts water. Upon cooling the mixture to room temperature, the dark rosin partitioned between two liquid phases: one, a light petroleum naphtha solution containing a paler colored fraction of the rosin, and the other, a heavier acetonitrile-water solution of a darker fraction having a large percentage of naphtha-insoluble material. The petroleum naphtha phases were separated and processed as follows:

(b) One solution was evaporated using a sparge of carbon dioxide. The yield of rosin was 110.5 parts (73.7%) grading "F." This product, after being heated for five minutes at 315° C. had a color of "I."

(c) The second petroleum naphtha solution was allowed to contact intimately 150 parts of calcined (3 hours at 300° C.) "Filtrol X–492" (an activated bentonite) for one hour at 60° C. After the adsorbent was removed by filtration, the petroleum naphtha solution was evaporated as in (b). The pale rosin yield was 96.5 parts (64.3%) and the grade was "WG." This product heat bleached to "WW."

(d) The third petroleum naphtha solution was treated in exactly the same manner as in (c) except that a different adsorbent was used: 150 parts of calcined Florex (fuller's earth). The refined rosin yield was 92 parts (61.3%) and the grade was "N." This product heat bleached to "WW."

It should be noted that the adsorbent refining steps (c) and (d) reduced the color 6 and 7 grades (U. S. D. A. rosin standards). In order to illustrate this unusual performance of this process, Example IA has been included to contrast the performance with that of a well-known rosin refining selective solvent, furfural.

*Example IA*

(a) For this experiment, a dark rosin was used that had been obtained by extracting Ponderosa pine stump wood with petroleum naphtha (petroleum naphtha-insoluble fraction of rosin was 4.3%; color darker than $D_0$). Similar to Example I, the following ingredients, after being solubilized at an elevated temperature, were placed in each of two separatory vessels: 150 parts of the dark rosin; 450 parts petroleum naphtha, and 70.5 parts water saturated furfural. Upon cooling to room temperature, the heavier furfural phases, containing the darkest rosin fraction, were separated. The petroleum naphtha solutions were processed further as follows:

(b) One solution was evaporated using a sparge of carbon dioxide to determine the characteristics of the paler rosin fraction. The yield of rosin was 110 parts (73.3%) and the color was "I."

(c) The second petroleum naphtha solution was allowed to intimately contact 150 parts of calcined Florex for one hour at room temperature. (The color refining capacity of the Florex was essentially the same at both room temperature and 60° C.) The adsorbent was removed by filtration, and the "refined" solution evaporated as in (b). The yield of rosin was 95.5 parts (63.7%) and the color "K."

To summarize the preceding, in Example I when the naphtha-insoluble fraction was separated with acetonitrile, the resultant crude pale solution could be directly adsorbent refined with Florex to give a product six grades paler. In contrast, the crude pale solution in Example IA could be further Florex refined only one grade when the naphtha-insoluble fraction was separated with furfural.

*Example II*

The following experimental data show this process to be operable for refining dark rosins which were obtained from completely different sources.

In a series of side-by-side experiments, six tests were made using the following initial formulation: 150 parts of dark rosin, 450 parts petroleum naphtha, 25 parts acetonitrile, and 4.8 parts water. After effecting solution at an elevated temperature, the mixtures were transferred to separatory vessels and the heavier dark fractions separated. For experiments 1, 2, and 3, the dark rosin which was used had been extracted from Ponderosa pine stump wood with methyl isobutyl ketone (naphtha-insoluble fraction was 19.5%; color darker than "D"). In experiments 4, 5 and 6, the dark rosin used had been extracted from Longleaf (or Southern) pine stump wood with toluene (naphtha-insoluble fraction was 17.9%; color darker than "D").

The petroleum naphtha solutions were treated in the following manner: (a) The solutions from 1 and 4 were evaporated using a sparge of carbon dioxide to determine the yield of the crude pale fraction from the initial separations. (b) The solutions from 2 and 5 were each intimately contacted for one hour with 150 parts of calcined Florex at room temperature. The refined solutions were evaporated as in (a) to determine product characteristics. (c) In an identical manner to that used in (b) solutions from 3 and 6 were refined with 150 parts of "Filtrol X–492."

The yields and colors obtained in the foregoing examples may be summarized as follows:

| Experiment Number | Dark Rosin Source | Adsorbent | Pale Rosin Product | | |
|---|---|---|---|---|---|
| | | | Parts | Percent of Input | Color U. S. D. A. |
| 1 | Ponderosa Pine | None | 106.5 | 71.0 | G |
| 2 | do | Florex | 91.0 | 60.7 | N |
| 3 | do | "Filtrol X–492" | 95.5 | 63.7 | N |
| 4 | Southern Pine | None | 109.0 | 72.7 | G |
| 5 | do | Florex | 92.0 | 61.3 | N |
| 6 | do | "Filtrol X–492" | 97.0 | 64.7 | N |

*Example III*

This example is included to demonstrate the effect of water in the initial separation of the dark rosin. Using the following formulations, solution was effected at an elevated temperature and the whole cooled to room temperature in separatory vessels:

| Ingredient [1] | Experiment Number | | | | |
|---|---|---|---|---|---|
| | 1 | 2 | 3 | 4 | 5 |
| Dark Rosin [2] | 150 | 150 | 150 | 150 | 150 |
| Petroleum Naphtha | 450 | 450 | 450 | 450 | 450 |
| Acetonitrile | 25 | 25 | 25 | 25 | 25 |
| Water | None | 2.2 | 4.8 | 11.8 | 25 |

[1] Units expressed in parts by weight.
[2] Obtained by extracting Ponderosa pine stump wood with toluene (naphtha-insoluble fraction was 17.0% and color was darker than "D").

The characteristics which were determined on the fractions which separated in each test are summarized below:

| | Experiment Number | | | | |
|---|---|---|---|---|---|
| | 1 | 2 | 3 | 4 | 5 |
| Crude Pale Fraction: | | | | | |
| Yield, Percent | 76.7 | 72.7 | 72.7 | 73.0 | 73.3 |
| Color | F | H | H | H | H |
| Dark Fraction: Naphtha-Insoluble Content, Percent | 70.2 | 73.4 | 76.4 | 75.4 | 73.4 |

*Example IV*

The purpose of this example is to illustrate the wide variations in the concentration of the petroleum naphtha solution which can be tolerated to obtain the initial separation. The feed rosin in the experiments was the same as that used in Example III. The initial separations were made as in the previous examples using the following ingredient formulations:

| Ingredient [1] | Experiment Number | | | | | |
|---|---|---|---|---|---|---|
| | 1 | 2 | 3 | 4 | 5 | 6 |
| Dark Rosin [2] | 150 | 150 | 150 | 150 | 150 | 150 |
| Petroleum Naphtha | 450 | 390 | 330 | 270 | 210 | 150 |
| Acetonitrile | 25 | 25 | 25 | 25 | 25 | 25 |
| Water | 4.8 | 4.8 | 4.8 | 4.8 | 4.8 | 4.8 |

[1] Units expressed in parts by weight.
[2] Obtained by extracting Ponderosa pine stump wood with toluene (naphtha-insoluble fraction was 17.0% and color was darker than "D").

The crude pale and dark fractions analyzed as follows:

| | Experiment Number | | | | | |
|---|---|---|---|---|---|---|
| | 1 | 2 | 3 | 4 | 5 | 6 |
| Crude Pale Fraction: | | | | | | |
| Solution concn., percent | 19.0 | 21.5 | 24.7 | 27.4 | 32.9 | 41.6 |
| Yield, percent | 72.0 | 72.0 | 72.7 | 71.7 | 72.0 | 73.0 |
| Color | H | H | G | G | F | E |
| Dark Fraction: Naphtha-Insoluble Content, percent | 75.6 | 75.4 | 72.8 | 72.6 | 70.8 | 67.4 |

Example V

The naphtha-insoluble fraction of the dark rosin can be effectively separated with various amounts of acetonitrile as the following example shows.

Solutions were prepared at an elevated temperature using a dark rosin, obtained by extracting Ponderosa stump wood with methyl isobutyl ketone (same as in Example II) and the following recipe:

| Ingredient [1] | Experiment Number | | | | | |
|---|---|---|---|---|---|---|
| | 1 | 2 | 3 | 4 | 5 | 6 |
| Dark Rosin [2] | 150 | 150 | 150 | 150 | 150 | 150 |
| Petroleum Naphtha | 450 | 450 | 450 | 450 | 450 | 450 |
| Acetonitrile | None | 15 | 25 | 50 | 75 | 100 |
| Water | None | 2.8 | 4.8 | 9.5 | 14.3 | 19.1 |

[1] Units expressed in parts by weight.
[2] Obtained by extracting Ponderosa pine stump wood with toluene (naphtha-insoluble fraction was 17.0% and color was darker than "D")

The mixtures were cooled to room temperature to permit the phases to separate. The crude pale rosin and naphtha-insoluble fractions analyzed as follows:

| | Experiment Number | | | | | |
|---|---|---|---|---|---|---|
| | 1 | 2 | 3 | 4 | 5 | 6 |
| Crude Pale Fraction: | | | | | | |
| Solution concn., percent | 19.5 | 19.1 | 18.8 | 18.6 | 18.4 | 18.3 |
| Yield, percent | 71.3 | 70.0 | 70.0 | 69.3 | 68.7 | 68.3 |
| Color | G | H | H | G | G | F |
| Dark Fraction: Naphtha-Insoluble Content, percent | 74.0 | 76.6 | 81.0 | 80.2 | 78.4 | 78.6 |

Example VI

The ability of an acetonitrile and water mixture to serve as a revivification solvent is demonstrated by this example by comparison to acetone, a well-established revivifying solvent.

In this experiment, a dark rosin extracted with toluene from Ponderosa pine stumps was used. The crude pale fraction was separated in five side-by-side experiments, as in Example I, using the following recipe: 100 parts dark rosin, 300 parts petroleum naphtha, 16.7 parts acetonitrile, and 3.2 parts water. The crude pale fraction was obtained in 73.5% yield with a color of "H."

The crude pale rosin solutions were contacted with 100 parts of "Filtrol X-492" for one hour at room temperature. Revivification of the "Filtrol," where specified, was achieved by washing spent "Filtrol" with acetonitrile (84% solution with water) until the acetonitrile was found to contain substantially no adsorbate. Pertinent details on the refining and product rosin are as follows:

| | Experiment Number | | | |
|---|---|---|---|---|
| | 1 [1] | 2 [2] | 3 [1] | 4 [3] |
| Refined Rosin: | | | | |
| Yield, Percent | 59.5 | 59.5 | 60.0 | 59.0 |
| Color | X | X | X | WW |

[1] Fresh "Filtrol X-492" was used in the refining step.
[2] The same "Filtrol X-492" was used as in Experiment 1. It had been revivified with a mixture of acetonitrile (84%) and water (16%).
[3] The same "Filtrol X-492" was used as in Experiment 3. It had been revivified with acetone.

Example VII

This example is identical to Example VI, the only difference being that the adsorbent refining step was carried out at 104–5° C.

Refined rosin data are summarized below:

| | Experiment Number | | | |
|---|---|---|---|---|
| | 1 [1] | 2 [2] | 3 [1] | 4 [3] |
| Refined Rosin: | | | | |
| Yield, Percent | 62.0 | 60.0 | 60.5 | 59.5 |
| Color | WW | X | WW | XX |

[1] Rosin refined with fresh "Filtrol X-492."
[2] "Filtrol X-492" from Experiment 1 used after being revivified by washing with an acetonitrile (84%)-water (16%) solvent.
[3] "Filtrol X-492" from Experiment 3 used after being revivified with acetone.

Example VIII

This example was carried out in the same manner as Example VII with the exception that the adsorbent used in these refining tests was Florex.

Pertinent data are listed below:

| | Experiment Number | | | |
|---|---|---|---|---|
| | 1 [1] | 2 [2] | 3 [1] | 4 [3] |
| Refined Rosin: | | | | |
| Yield, Percent | 60.0 | 59.0 | 59.5 | 58.5 |
| Color | N | N | N | N |

[1] Crude pale solution refined with fresh Florex.
[2] Florex from Experiment 1 was used after being revivified with acetonitrile (84%)-water (16%) solvent.
[3] Florex from Experiment 3 was used after being revivified by washing with acetone.

Example IX

The acetonitrile which had been used as a revivification solvent in Experiment 2 of the preceding example was extracted with an equal volume of petroleum naphtha. There was obtained a solution of refinable rosin in petroleum naphtha and a solution of naphtha insolubles in acetonitrile. The rosin solution was recycled as feed for the recovery of rosin by the process of the invention.

Example X

In this example, a dark rosin was used that had been obtained by extracting Ponderosa pine stump wood with methyl isobutyl ketone. The following ingredients were solubilized at an elevated temperature: 30 parts of the dark rosin; 72 parts of petroleum naphtha; 4.5 parts of acetonitrile-water azeotrope; and 1.1 parts water. Upon cooling to room temperature, the heavier, dark acetonitrile phase was separated. The crude pale rosin solution, after water washing, analyzed:

Acetonitrile _____ 0.2%.
Rosin concentration _____ 22.8%.[1]
Crude pale:
    Melting point _____ 72.0° C.
    Color _____ F$_1$.
    Acid number _____ 139.
    Specific rotation _____ +21°.

[1] 63.6% of the feed rosin.

The crude pale rosin solution was pumped through nine colums in progressive series at room temperature. Each adsorbent column contained Grade 70 silica gel (Davison Chemical Co.). The refinery operation was conducted at a silica gel/rosin weight ratio of 0.97 using acetonitrile-water azeotrope to regenerate the spent columns. The yields and characteristics of pale rosin and adsorbed resin (based on the crude pale fraction) were:

|  | Pale Rosin | Adsorbed Resin |
|---|---|---|
| Yield, Percent | 78.7 | 21.3 |
| Melting Point, °C | 77 | 77 |
| Color, U. S. D. A | N$_4$ | Dark |
| Acid Number | 157 | 97 |
| Specific Rotation degree | +18 | |
| Gasoline Insoluble, Percent | | 19.6 |

In more detail, the first step of the process involves the separation of dark rosin into a crude pale rosin fraction and a fraction containing the bulk of naphtha-insoluble material by partitioning the dark rosin between an adsorbent refining solvent and acetonitrile. One method by which this may be accomplished comprises simple admixture of the dark rosin, acetonitrile and adsorbent refining solvent followed by the separation of the mixture into immiscible phases comprising a crude pale rosin solution and a solution of naphtha-insoluble material. Separation can also be accomplished in extraction towers and can, if desired, include a plurality of stages.

The temperature for effecting the separation is preferably between 15° and 35° C. assuming that the adsorbent refining step will be carried out within a similar range. Lower temperature separations, however, are possible within the range of about 0–15° C. but generally require cooling equipment. Higher temperature separations are also practical when the subsequent adsorbent refining step is to be carried out at higher temperatures.

The amount of acetonitrile to be used will depend primarily upon the percentage of naphtha-insoluble material in the dark rosin feed, the objective being to obtain a fluidized naphtha-insoluble fraction in the form of a solution. For example, when the dark rosin has a naphtha-insoluble content of 20%, the ratio of acetonitrile to dark rosin should be 1:1, on a weight basis, or lower. A practical range of operation is to use an amount of acetonitrile corresponding from 0.1 to 5 parts by weight for each part of naphtha-insoluble material in the dark rosin.

The acetonitrile used may be anhydrous or may contain up to 50% water by weight without appreciably affecting the results of separation. In commercial practice it is convenient to use a constant boiling mixture of acetonitrile and water comprising about 84% acetonitrile and 16% water which boils at 76° C.

The adsorbent refining solvent may be any of those that are conventionally used in the adsorbent refining of rosin. The preferred adsorbent refining solvent is petroleum naphtha which is used generically herein as inclusive of paraffinic solvents such as propane, pentanes, hexanes, heptanes and the like which are also immiscible with acetonitrile.

The ratio of naphtha to dark rosin in the separation step of the invention should be at least 1:1, by weight, and preferably an amount which will provide a crude pale rosin solution having a concentration of 10–35% by weight.

The crude pale rosin solution resulting from the initial separation will normally contain some residual acetonitrile and it is next passed into contact with a suitable adsorbent of the type conventionally used in rosin refining. Although the residual acetonitrile can be removed from the crude pale rosin solution by such techniques as distillation or water extraction, this is not usually necessary unless the acetonitrile content is excessively high.

Operable adsorbents in the second step of the process include, by way of example, fuller's earth, silica gel, carbon, activated bentonite, activated alumina and magnesium silicate. The manipulative procedures to be followed in this step are well known in the art and include simple admixture of the crude pale rosin solution with the adsorbent followed by filtration, or passage of the crude pale rosin solution through one or more beds of adsorbent. The adsorbent refining step can be conducted at temperatures ranging from that of the environment to the boiling point of the refining solvent.

The ratio of adsorbent to crude pale rosin solution is not critical and may be varied at will. As those skilled in the art will understand, the variations in the ratio will affect only the rate at which the adsorbent becomes spent. For example, in the passage of a crude pale rosin solution through a bed of adsorbent, the adsorbent is spent when the effluent solution is found to contain a predetermined amount of discoloring bodies.

The acetonitrile solution of naphtha-insolubles and dark components can, if desired, be treated separately to recover valuable components therefrom by evaporation or other known techniques.

The third step of the process comprises revivifying the adsorbent with acetonitrile which, like the initial separation step, may contain up to about 50% by weight of water. The revivification step comprises simply contacting the acetonitrile and the spent adsorbent whereby adsorbate is removed from the surfaces of the adsorbent. It can be effected, for example, by passing acetonitrile through beds of the adsorbent between room temperature and the boiling point of the acetonitrile until the effluent acetonitrile is found to contain no appreciable quantity of adsorbate.

Following the revivification, it is sometimes desirable to remove the acetonitrile from the surfaces of the adsorbent and this can be accomplished by purging with adsorbent refining solvent, by heating the adsorbent above the boiling temperature of the acetonitrile or by steam purging.

The fourth and final step of the process comprises recovering adsorbate from the acetonitrile used for revivification. In practice, the adsorbate has been found to comprise about 25–60% by weight of refinable rosin which can be recycled to the first step of the process. The adsorbate can be recovered from the acetonitrile by direct evaporation or, preferably, it can be recovered by extracting the acetonitrile used for revivification with adsorbent refining solvent. In the latter instance, the dilute solutions of refinable rosin in adsorbent refining solvent are then recycled to the first step of the process. The residual acetonitrile which now contains primarily naphtha-insolubles can be treated in the same manner as the acetonitrile solution obtained in the first step for the recovery of the naphtha-insolubles.

What I claim and desire to protect by Letters Patent is:

1. The process for refining dark rosin which comprises separating dark rosin into a crude pale rosin fraction and a fraction containing primarily naphtha-insoluble material by partitioning the dark rosin between an adsorbent refining solvent and acetonitrile, the amount of acetonitrile being in the range of 0.1 to 5 parts per part of said naphtha-insoluble material, and contacting the resultant solution of crude pale rosin with a solid adsorbent.

2. The process of claim 1 in which the adsorbent refining solvent is petroleum naphtha.

3. The process of claim 2 in which the solid adsorbent is fuller's earth.

4. The process of claim 2 in which the solid adsorbent is an activated bentonite.

5. The process of claim 2 in which the solid adsorbent is silica gel.

6. The process of claim 1 in which the solid adsorbent is revivified by contact with acetonitrile and refinable rosin is recovered from the acetonitrile used in revivification.

7. A process for refining dark rosin which comprises mixing together a dark rosin containing naphtha-insoluble material, acetonitrile and a petroleum naphtha, the amount of acetonitrile being in the range of 0.1 to 5 parts per part of said naphtha-insoluble material, allowing the mixture to separate in two immiscible phases comprising a petroleum naphtha solution of crude pale rosin and an acetonitrile solution of primarily naphtha insolubles, and contacting the solution of crude pale rosin with a solid adsorbent.

8. The process of claim 6 in which the solid adsorbent is revivified by contact with acetonitrile and the acetonitrile used in revivification is extracted with petroleum naphtha to recover refinable rosin.

9. The process of claim 2 in which the solid adsorbent is an activated alumina.

10. The process of claim 2 in which the solid adsorbent is carbon.

References Cited in the file of this patent

UNITED STATES PATENTS

| | | |
|---|---|---|
| 1,505,438 | Sherwood et al. | Aug. 19, 1924 |
| 1,715,088 | Kaiser et al. | May 28, 1929 |
| 1,807,599 | Palmer et al. | June 2, 1931 |
| 2,094,503 | Sheffield | Sept. 28, 1937 |
| 2,117,572 | Rankin | May 17, 1938 |
| 2,281,078 | Price et al. | Apr. 28, 1942 |
| 2,324,223 | Martin | July 13, 1943 |

FOREIGN PATENTS

| | | |
|---|---|---|
| 636,752 | Great Britain | May 3, 1950 |